United States Patent [19]

Bednar

[11] Patent Number: 4,711,754

[45] Date of Patent: Dec. 8, 1987

[54] METHOD AND APPARATUS FOR IMPACTING A SURFACE WITH A CONTROLLED IMPACT ENERGY

[75] Inventor: Fred H. Bednar, Pittsburgh, Pa.

[73] Assignee: Westinghouse Electric Corp., Pittsburgh, Pa.

[21] Appl. No.: 788,981

[22] Filed: Oct. 18, 1985

[51] Int. Cl.$^4$ .......................... G21C 17/00; C05F 3/00
[52] U.S. Cl. ...................................... 376/245; 73/1 B; 73/1 D; 73/12
[58] Field of Search .................. 376/245; 367/190; 73/1 D, 12, 82, 1 B

[56] References Cited

U.S. PATENT DOCUMENTS

| | | | |
|---|---|---|---|
| 2,923,904 | 2/1960 | Hieber | 73/1 D |
| 3,241,355 | 3/1966 | McLean | 73/1 D |
| 3,295,355 | 1/1967 | Fisher et al. | 73/1 D |
| 3,350,916 | 11/1967 | Bock | 73/1 D |
| 3,578,102 | 5/1971 | Ross et al. | 367/190 |
| 3,795,286 | 3/1974 | Meyer | 367/190 |
| 3,830,091 | 8/1974 | Sinsky | 73/1 D |
| 3,863,202 | 1/1975 | Landrum, Jr. | 367/190 |
| 4,052,882 | 10/1977 | Wittkowski | 73/1 D |
| 4,063,613 | 12/1977 | Silverman | 367/190 |
| 4,499,906 | 2/1985 | Wohlgemuth et al. | 73/82 |

FOREIGN PATENT DOCUMENTS

| | | | |
|---|---|---|---|
| 2145227 | 3/1985 | United Kingdom | 73/82 |
| 699438 | 12/1979 | U.S.S.R. | 73/1 D |
| 731383 | 4/1980 | U.S.S.R. | 73/1 D |
| 993131 | 1/1983 | U.S.S.R. | 73/1 D |

Primary Examiner—Salvatore Cangialosi

Attorney, Agent, or Firm—Daniel C. Abeles

[57] ABSTRACT

A method and apparatus for impacting a surface with a desired kinetic impact energy wherein an impacting device which can apply a variable impact energy corresponding to the magnitude of an input control signal is provided and placed adjacent the surface to be impacted. Thereafter, an input control signal of a preset magnitude is applied to the impact device to initiate an impact, the kinetic energy of the impact is determined, the value of the determined kinetic energy is compared with a value corresponding to the desired kinetic impact energy, the results of the comparison are indicated, the preset magnitude of the signal used for the control signal is adjusted to reduce any difference noted as a result of the comparison, and the process is repeated until a repeatable impact of the desired impact energy is determined and indicated. Preferably, the impacting device is a solenoid whose plunger provides the impact, the input control signal is an input voltage applied across the solenoid coil, and the impact energy is determined by measuring the velocity of the plunger just prior to impact by: sampling the magnitude of a signal, whose magnitude is proportional to the distance moved by said plunger, at uniform time increments; subtracting the sampled values from successive sampling times to provide difference values; and, upon detecting a zero difference value, indicating that impact has occurred, utilizing the immediately previously provided difference value as a measure of the velocity of the plunger just prior to impact, and thus of the kinetic impact energy.

16 Claims, 7 Drawing Figures

METHOD AND APPARATUS FOR IMPACTING A SURFACE WITH A CONTROLLED IMPACT ENERGY

BACKGROUND OF THE INVENTION

1. Field of the Invention

The present invention relates to a method and apparatus for impacting a, surface with a controlled desired impact energy. More particularly, the present invention relates to a method and apparatus for impacting a surface with a small desired and controllable impact energy, whereby the sensitivity of impact detectors mounted on the surface, and in particular a surface of a nuclear reactor coolant system, can be tested.

2. Description of the Prior Art

In the operation of pressurized water power generating plants, it is desireable to have a system which will enable the early detection of failure of primary system mechanical components. The failure of such mechanical components characteristically results in metal debris which concentrate in the steam generator input plenum and the bottom plenum of the reactor vessel. Moreover, metal debris in the form of objects left in the system during the construction phase are sometimes encountered. Such metal debris, when left undetected, have caused extensive damage to various components of the coolant system.

During normal operation of the reactor system, the metal debris are transported to collection points by the normal flow of the primary coolant and, during their travel, are propelled against the metal walls enclosing the primary system coolant paths. Accordingly, surveillance of the energy imparted to the metal walls as a result of the impacts will provide both an indication of primary system component failure, and an indication of the presence of undesirable metallic debris which could cause subsequent failures.

To detect the presence of metallic debris in the nuclear reactor coolant system, various systems for detecting the impact energy have been utilized. One such system is disclosed, for example, in U.S. Pat. No. 3,860,481 issued Jan. 14th, 1975 to R. Gopal et al and assigned to Westinghouse Electric Corporation. According to this system, a number of impact sensors, e.g. accelerometers, are disposed at strategic positions on the nuclear reactor coolant system, e.g. at the reactor vessel upper and lower plenums and the input plenum of each steam generator of the reactor coolant system, and the output signals from the impact sensors are detected and analyzed. According to current regulations issued by the Nuclear Regulatory Commission, each impact sensor must have a sensitivity capable of detecting an impact energy of 0.5 foot-pounds (0.68 joules) within three feet (0.91 meters) of an impact sensor. Accordingly, in order to test the sensitivity of the impact sensors, it becomes necessary to periodically impart an external impact with an energy corresponding to the desired sensitivity to a surface of the reactor coolant system adjacent a particular impact sensor. Moreover, in order to stress the design limits of the various detection algorithms, researchers often desire to measure and control desired impact energies of even a smaller value than the required sensitivity for the system, e.g. less than 0.1 foot-pounds.

A number of methods and apparatus for imparting such external impact energies to a surface are known. Such devices may be, for example, a spring loaded mass which renders impact energy proportional to the spring constant, a pendulum device for providing an impact energy corresponding to the mass of the pendulum and the vertical height from which it is dropped to provide an impact, or a manually operated force hammer, including a transducer which produces an output which is a force versus time function, which is struck against the desired surface and the kinetic energy calculated from the area under the force versus time function.

All of the known devices suffer from the disadvantage that there is always a degree of uncertainty of the true impact energy. This results for example, because the first two devices include frictional forces and/or spring constants which may vary considerably, and because all of the devices involve some manual manipulation of the impact imparting device, thus rendering it difficult, to repeatedly apply an impact of a desired energy. Moreover, as a result of the manual manipulation involved, and the increased time required to determine or calculate the impact energy and, if necessary, vary the impact force and repeat the impact to provide the desired impact energy, the time of exposure to radiation by the personnel operating the impact device is undesirably increased. Finally, the known devices suffer from the problem that they are difficult, if not impossible, to use on surfaces with particular orientation or location. This latter problem is of particular significance when attempting to impact the bottom plenum of the reactor vessel which can only be approached from the bottom, and not from the side, and thus the impact must be applied in an upward vertical direction. This is not possible with a pendulum and difficult with the other devices.

SUMMARY OF THE INVENTION

It is therefore an object of the present invention to provide a method and apparatus for impacting a surface with a desired impact energy which is fully automatic in operation and does not require any manual manipulation of the impact device by the operator.

It is another object of the present invention to provide a method and apparatus which can automatically and repeatedly provide a desired impact energy to a surface in a short period of time, and which will immediately indicate the impact energy to the operator.

It is a further object of this invention to provide an apparatus for impacting a surface with a desired impact energy which is simple to use, and which is substantially unaffected by the shape or location of the surface to be impacted, or by the orientation of the impacting device.

The above objects are achieved according to the basic concept of the present invention by a method comprising the steps of:

(a) providing an impacting device which can apply a variable impact energy corresponding to the magnitude of an input control signal;

(b) placing the impact device adjacent the surface to be impacted;

(c) thereafter applying an input control signal of a present magnitude to said impact device to initiate an impact;

(d) determining the kinetic energy of the impact;

(e) comparing the value of the determined kinetic energy with a value corresponding to the desired kinetic impact energy;

(f) indicating the results of the comparison;

(g) adjusting the present magnitude of the signal used for said control signal to reduce any difference as a result of the comparison; and (h) thereafter repeating steps (c) to (g) until a repeatable impact of the desired impact energy is determined and indicated.

According to the preferred embodiment of the invention, the impacting device is a solenoid whose plunger of a known mass provides the impact, the input control signal is an input voltage applied across the solenoid coil, and the kinetic impact energy is determined by measuring the velocity of the plunger just prior to impact. Preferably this final velocity is measured by: detecting the movement of the plunger and producing an output signal whose magnitude is proportional to the distance moved by the plunger after application of said input voltage; sampling the magnitude of the output signal at uniform time increments; comparing the sampled values from successive sampling times; and, upon detecting a zero difference between two compared values (indicating that impact has occurred), utilizing the difference between the last two different sampling values as a measure of the velocity of the plunger just prior to impact, and thus of the kinetic impact energy.

According to a feature of the invention, compensation for initial adhesion forces which may exist in the solenoid is provided by: initially slowly increasing the magnitude of a voltage signal applied to the solenoid coil, sensing the position of the plunger, and applying the input control voltage of present magnitude to the solenoid coil to initiate an impact only upon sensing an initial change in the position of the plunger.

Although the method according to the invention can theoretically be carried out utilizing analog data processing, according to the preferred and disclosed embodiment of the invention, the method is carried out under control of a programmed microprocessor. Moreover, according the preferred embodiment of the invention, the position of the solenoid plunger is detected by means of a linear variable differential transformer whose moveable core follows the movement of the plunger and whose output signal magnitude is thus a measure of the plunger position.

DETAILED DESCRIPTION OF THE PREFERRED EMBODIMENT

Figure 1:
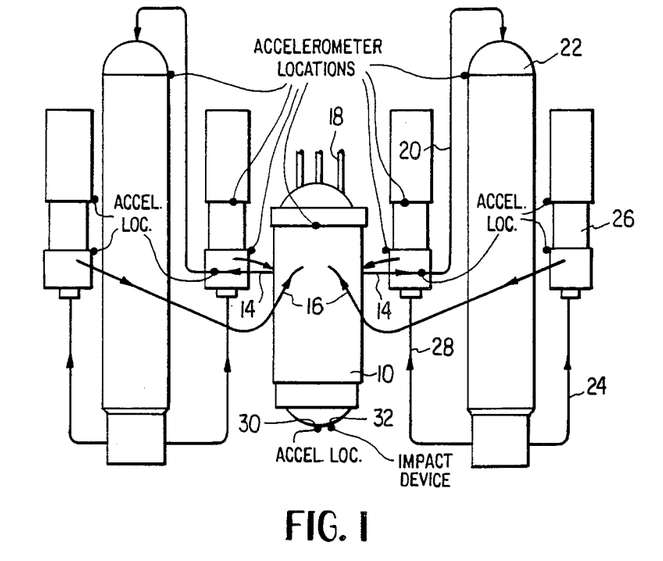
FIG. 1 is a schematic plan view of a nuclear reactor illustrating the general location of the impact detectors or sensors whose sensitivity is to be tested by an impact device according to the invention.

Referring now to FIG. 1, there is shown a plan view of a nuclear reactor power generating system of the pressurized water type illustrating the relative position of the impact sensors, e.g., accelerometers, for monitoring the metal impacts sustained by the primary system components confining the reactor coolant. The system includes a pressure vessel 10 which forms a pressurized container when sealed by its head assembly. The vessel 10 has coolant flow inlets 16 and coolant flow outlets 14 formed integral with and through its cylindrical walls. As is known in the art, the vessel 10 contains a nuclear core (not shown) consisting mainly of a plurality of clad nuclear fuel elements which generate substantial amounts of heat depending primarily upon the position of a control means, the pressure vessel housing 18 of which is shown. The heat generated by the reactor core is conveyed from the core by coolant flow entering through inlets 16 and exiting through outlets 14. The coolant flow exiting through outlet 14 is conveyed through a hot leg conduit 20 to a heat exchange steam generator 22 which is of the type wherein the heated coolant flow is conveyed through tubes (not shown) which are in heat exchange relationship with the water which is utilized to produce steam. From the steam generator 22, the coolant flow is conveyed through conduit 24 to a pump 26 and then via a conduit 28 to the inlet 16 so as to provide a closed recycling primary or steam generating loop. The system illustrated in FIG. 1 has four such closed fluid systems or loops. Although the number of such systems or loops can vary from plant to plant, commonly two, three or four are employed.

In order to detect the presence of metal debris in the reactor coolant system, a plurality of impact sensors or accelerometers 30 are strategically positioned on the surface of the cooling system. As shown, and as indicated above, the impact sensors 30 are disposed at the upper and lower plenums of the reactor vessel 10, the input plenum of each steam generator 22, and at other places throughout the system.

As explained above, in order to monitor the sensitivity of the sensors 30, it is periodically necessary to externally apply an impact of an energy corresponding to the desired sensitivity to an outer surface of the coolant system or loop adjacent the sensor 30 to be monitored. For this purpose, an impacting device is appropriately positioned and one or more sequential impacts are produced until an impact of the desired energy is realized. Such a positioned impacting device 32 for monitoring the sensitivity of the impact sensor 30 attached to the bottom plenum of the vessel 10 is shown schematically in FIG. 1.

Figure 2:
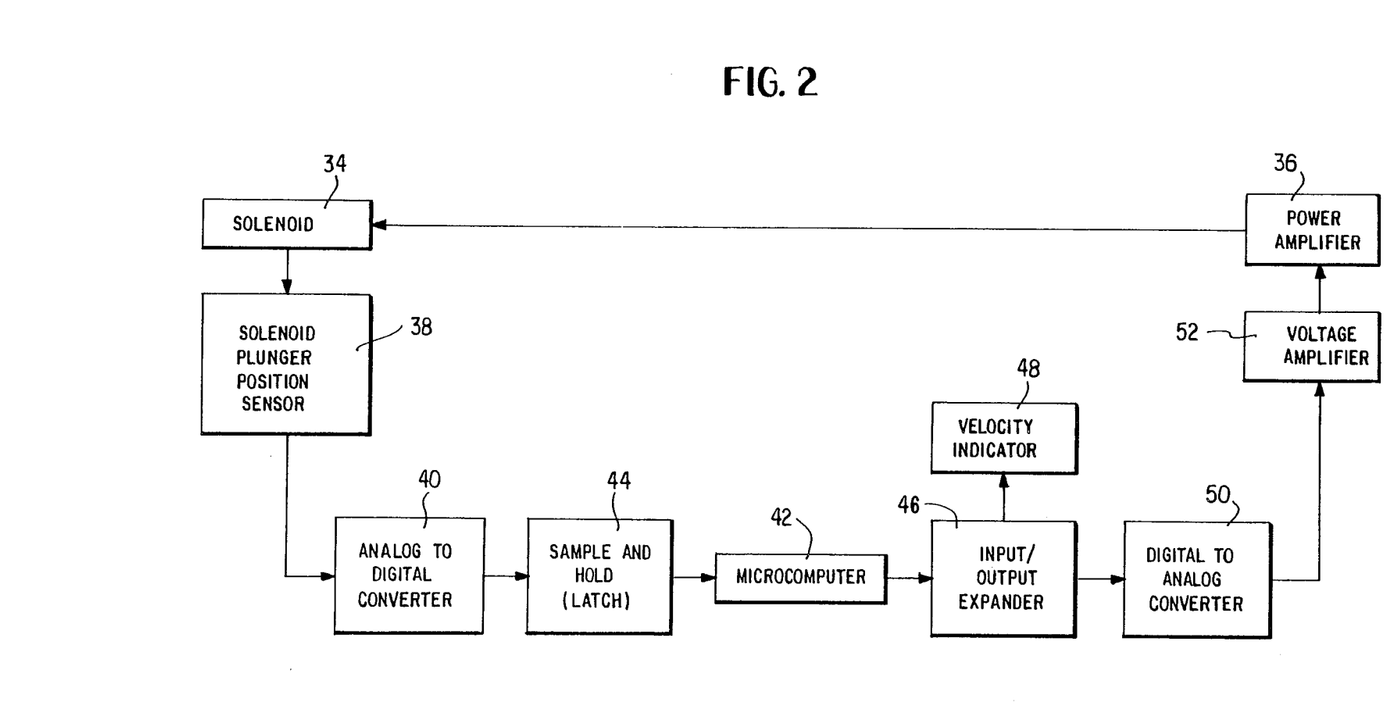
FIG. 2 is a block circuit diagram illustrating a preferred embodiment of the impact device according to the invention.

Turning now to FIG. 2, there is shown the basic block circuit diagram of a preferred embodiment of an impacting device 32 according to the invention. Although theoretically any device which can supply an impact in response to an input signal and whose impact energy can be measured, for example, compressed air, springs, pneumatics, can be used for the impact device 32, for various reasons, including simplicity, reliability and safety as a result of the environment in which the present invention is primarily intended to be used, according to the present invention the impacting device selected is a solenoid 34. The coil (not shown in this Figure) of solenoid 34 is connected to the output of a power amplifier 36 which can provide a controllable and variable input signal to the solenoid coil and cause the plunger (likewise not shown in this Figure) to move with a corresponding force against an adjacent surface to cause an impact. As indicated above, according to the present invention, the kinetic energy of the impact caused by the plunger of the solenoid 34 is determined, compared with a value corresponding to the desired kinetic energy, the results of the comparison are indicated, for example, high, low or desired value, and the output voltage of the amplifier 36 is adjusted and reapplied to the solenoid 34 in order to attempt to obtain an impact energy of the desired value. The process is repeated until an impact energy of the desired value is indicated by the results of the comparison.

Figure 3:
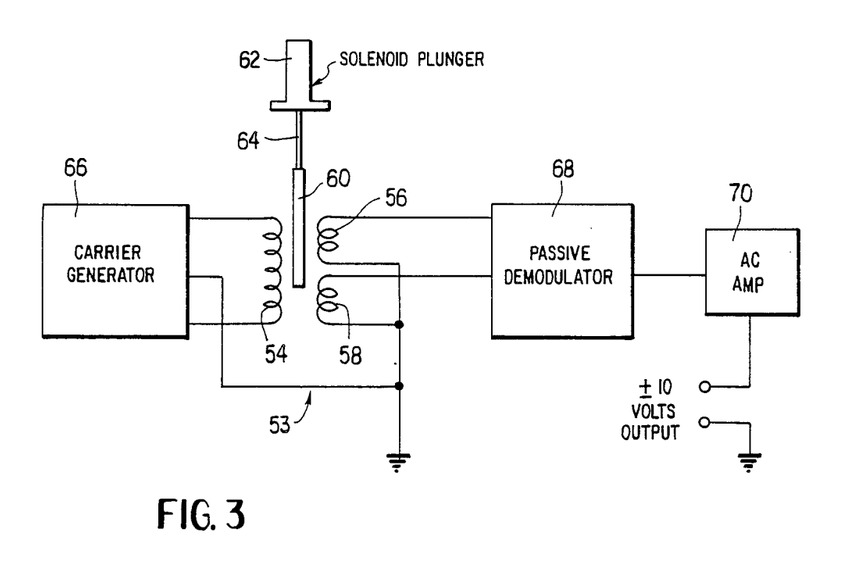
FIG. 3 is a block circuit diagram showing the position solenoid plunger position sensing device of FIG. 1.

According to the present invention, the impact energy of the solenoid plunger is derived from the known relationship that kinetic energy $=0.5 \, mV^2$. Since the mass of the plunger of solenoid 34 (plus any mass connected to the solenoid plunger), for a given impacting device 32 will be known, a determination of the final velocity of the plunger of solenoid 34, i.e. the velocity just prior to impact, will provide a measure of the impact energy. To determine this final velocity according to the illustrated preferred embodiment of the invention, the position of the plunger of the solenoid 34 is continuously detected by means of a position sensor 38 which produces an output signal corresponding, preferably linearly, to the instantaneous position of the solenoid plunger. Preferably the position sensor comprises a linear variable differential transformer arrangement as shown in FIG. 3 which will be discussed in more detail below. In any case, the output signal from the position sensor 38, which according to the preferred embodiment of the invention is a d.c. voltage whose magnitude is linearly proportional to the position of the plunger of the solenoid 34, is fed to an analog to digital converter 40 whose output is sampled at discrete time intervals by a microcomputer 42. Since the output state of the analog to digital converter 40 is, according to the preferred embodiment of the invention, an approximation type analog to digital converter whose output state is constantly changing, a latch 44 is provided between the output of the analog to digital converter 40 and the input of the microcomputer 42 in order to hold the position data between conversion cycles of the converter 40 so that the microcomputer 42 can read the position data asynchronously. That is, the microcomputer 42 need not read or sample the position data precisely when the conversion cycle of the converter 40 is complete.

In the microcomputer 42, the sampled position data from the analog to digital converter 40 are stored and utilized to calculate the final velocity of the solenoid plunger, and thus the kinetic energy of the impact. Since, as indicated above, sampling of the position data by the microcomputer 42 is carried out at discrete constant time intervals, for example, at 1 millisecond intervals, a first order approximation of the velocity can be derived by the difference between the values of two successively sampled position values, which is a measure of the distance travelled by the solenoid plunger during one sampling time interval. Accordingly, the microcomputer 42 compares successive sampled position values until no difference is detected, indicating that the solenoid plunger has stopped moving and thus delivered an impact, and then utilizes the immediately previous difference value to calculate the final velocity. That is, if $x(t)$ is the sampled position value at the time of impact, i.e., no difference is detected between $x(t)$ and $x(t+1)$, then the difference between the successive values $x(t)$ and $x(t-1)$ is utilized by the microcomputer 42 to calculate the final velocity of the plunger solenoid. Moreover, if the sampling interval is selected so that it is some power to the base ten of one, e.g. 1 millisecond as indicated above, then the difference between position values $x(t)$ and $x(t-1)$ can be directly used as a measure of the final velocity, i.e. no further calculation in the microcomputer 42 is required.

After calculation of the final velocity, the microcomputer 42 compares this calculated final velocity value with a precalculated value corresponding to the desired kinetic impact energy, which precalculated value is stored in a read only memory of the microcomputer 42, and provides an output signal indicating the results of the comparison to an input-output expander circuit 46 which causes a velocity indicator 48 to indicate the results of the velocity comparison, for example, a high, a low or an accepted indication. As a result of the velocity comparison, the microcomputer 42 also, if necessary, adjusts a stored digital value, which corresponds to the magnitude of the last voltage supplied to the solenoid 34 to initiate an impact, in a manner so as to reduce any error and thus attempt to cause the adjusted voltage subsequently applied to the solenoid 34 to produce an impact of the desired impact energy. Of course, if an accepted value of velocity (kinetic energy) is determined, then no further adjustment of the stored digital voltage value takes place. The "adjusted" digital voltage value, which is stored in the input/output expander circuit 46, is then fed via a digital to analog converter 50 and a voltage amplifier 52 to the power amplifier 36 so as to initiate a further impact by the solenoid 34. The above described process is repeated until such time as an acceptable velocity (kinetic energy) value is indicated by the indicator 48, and preferably until a repeatable acceptable value is indicated by the indicator 48.

Referring now to FIG. 3, there is shown a preferred arrangement for the position sensor 38 for the plunger of the solenoid 34. As shown, position sensor 38 includes a linear viable differential transformer 53 having a primary winding 54, a pair of secondary windings 56, 58 which are spaced symmetrically from the primary winding 54 and are connected in series opposition, and a magnetic core 60 which is axially moveable between the primary and secondary windings and whose position changes the mutual inductance between each secondary winding and the primary winding and determines the output across the secondary windings. The core 60 of the linearly variable differential transformer is connected to the plunger 62 of the solenoid 34 by means of a rod 64 so that the position of the moveable core 60, and hence the output voltage across the series connected secondary windings 56, 58, will correspond to the position of the plunger 62. The rod 64 is formed of a non-metallic material so as not to effect the mutual inductance between the primary and secondary windings of the transformer.

The a.c. carrier voltage excitation for the primary winding 54 is provided by a carrier generator 66 and is sufficiently high so as to permit linearity throughout the range of movement of the core 60 so that the output will be proportional to the input throughout this range. The output signal across the secondary windings 56, 58, is fed to a passive demodulator 68 and then to an a.c. amplifier 70 which provides a d.c. output voltage whose magnitude is directly proportional to the position of the core 60, and thus of the solenoid plunger 62. For example, in the preferred embodiment of the invention the amplifier 70 provides an output voltage of 10V through one inch of displacement of the core 60. That is, the output voltage will vary from 0 to 10 V d.c. upon one half inch of movement of the core from the null position of the core 60.

The use of a liner variable transformer arrangement as shown in FIG. 3 for the position sensor 32 provides a number of substantial advantages. Initially, if the solenoid plunger 62 with the attached core 60 are properly aligned, there is no physical contact between the core 60 and the coil structure of the transformer, which means that the position sensor 32 is practically frictionless. This permits critical measurements that can tolerate the low mass core 60, which for example has a mass of 0.022 kg, but cannot tolerate friction loading. Moreover, the frictionless operation of the linear voltage differential transformer arrangement combined with the induction principle and operation permits the device to respond to minute motions of the core 60, and thus of the plunger 62 of the solenoid 34. This is of course an important consideration in attempting to detect impact energy of the magnitude indicated above, i.e. 0.5 ft.-lb. (0.68 joules) which necessarily implies very small masses for the solenoid plunger 62 and very small travel lengths. For example, in order to create such an impact energy with the system according to the invention, a solenoid 34 having a plunger weighing 0.15 pounds (0.33 kg) with an attached core weighing 0.01 pounds (0.022 kg), i.e., a total weight of 0.16 pounds (0.352 kg) which travelled through a distance of 0.5 inch (0.127 cm) was utilized.

Figure 4:
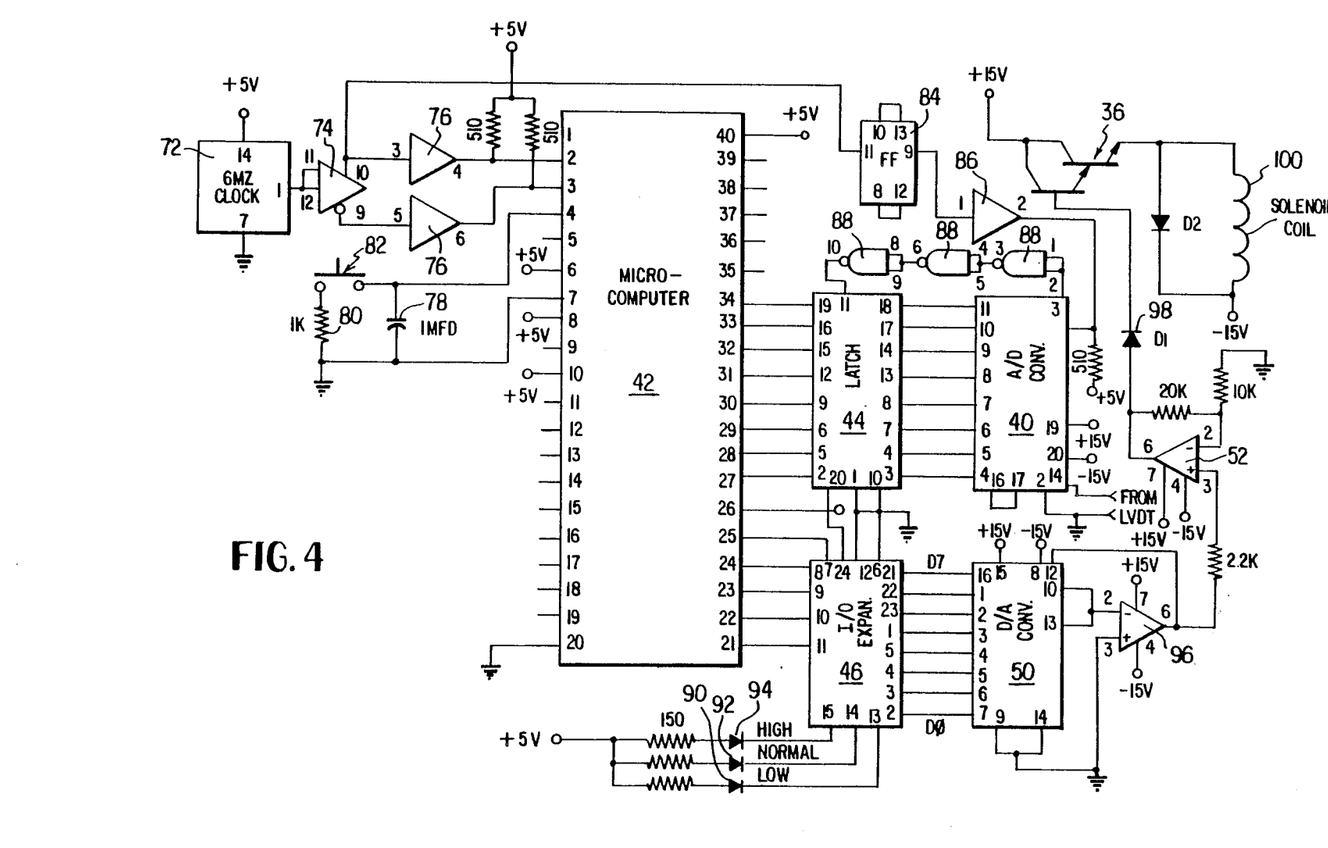
FIG. 4 is a detailed schematic circuit diagram of the preferred embodiment of the impacting device according to the invention of FIG. 2.

Referring now to FIG. 4, there is shown a block circuit diagram for a specific embodiment of the invention generally shown in FIG. 2, and accordingly the same reference numerals are utilized in FIG. 4 to identify the corresponding structure in FIG. 2. As indicated above, and as shown in FIG. 4, the basic control of the circuit according to the invention is the microcomputer or microprocessor 42 which is realized by an Intel 8741 integrated circuit microprocessor. Clock pulses for the microprocessor 42 are provided by a six MZ clock pulse generator 72 which may for example be a TTL DIP crystal clock type integrated circuit. Since the selected microcomputer 42 requires complementary clock inputs at its pins 2 and 3, the output of the clock pulse generator 72 is initially fed to a complementary driver circuit 74 whose complementary outputs are fed via respective buffer amplifiers 76 (which may form part of a common integrated circuit, for example a 7404 integrated circuit) to the clock input pins of the microprocessor 42. In order to be able to reset the internal program counter of the microprocessor 42 to 0, and thus initialize the program, a reset circuit is connected between the reset input (pin 4) and pin 7 (which is connected to ground) of the microprocessor 42. The reset circuit includes a one microfarid capacitor 78 which is connected between the pins 4 and 7 of the microprocessor 42, and which, via internal circuitry contained in the 8741 microprocessor chip, will provide an automatic initialization pulse whenever power is supplied to the microprocessor. To provide an external reset pulse at the desired time, the series connection of a resistor 80 and a normally open switch 82 is connected in series with the capacitor 78.

The output signal from the solenoid plunger position sensor 38, and in particular the output signal from the AC amplifier 70, (FIG. 3) is fed to appropriate pins of the analog to digital converter 40, which is realized by an ADC82AM analog to digital converter integrated circuit chip which is a high speed 8 bit successive approximation A/D converter. To ensure adequate sampling by the circuit used for the analog to digital converter 40 within its linear range, a 3 megahertz external clock is applied to the analog to digital converter 40. This is achieved by connecting the output of the driver circuit 74 to the clock input of the converter 40 via a D-type flip flop 84, which divides the clock pulse signal from the circuit 74 in half, and a buffer amplifier 86. The ADC82AM converter chip used for the analog to digital converter 40 was configured, by selection of its scaling resistors, for a 0 to +10 volt input range, and for complementary straight binary by connecting pin 16 to pin 17 as illustrated.

As indicated above, in order to hold the sample from the analog to digital converter 40 between conversion cycles, the output samples from the A/D converter 40 are fed to the microprocessor 42 via a sample and hold circuit or latch 44 which is realized by a 74LS377 octal D-type flip flop integrated circuit. In this latch circuit, there is a data set up time, i.e. the time the data is stable before a clock, of approximately 25 nanoseconds. In order to accommodate a minimum set up time and clock phase, three series connected NAND-gates 88 (which are realized by a single 74LS00 integrated circuit) are connected between the the status line pin of the A/D converter 40 and the clock input of the latch 44.

The input/output expander circuit 46 is, as shown in FIG. 4, realized by a intel 8243 integrated circuit chip which is specifically designed for use with the intel 8741 single chip microprocessor. The input/output expander circuit 46 was implemented in order to expand the microprocessor 42 for additional output lines and so as to offer higher drive capability in order to drive the velocity indicator 48, which, as shown in FIG. 4 is realized by three light emitting diodes 90, 92, 94, which indicate "low", "normal", and "high" comparison results respectively, and for the eight bits of the digital time analog inverter 50. The D/A converter 50 (which in the illustrated embodiment of the invention is a Burr-Brown DAC 90BG digital to analog converter) provides an output current proportional to the input code thereto from the expander circuit 46. To provide the proper loading for the D/A converter 50 so as to ensure minimal effects on the accuracy of the converter 50, the output of the D/A converter 50 is fed to the high impedance summing junction of an operation amplifier 96 (for example, an LF351 operational amplifier) whose output is connected to an internal feedback resistor in the D/A converter 50. The illustrated disclosed configuration of the D/A converter 50 and the operational amplifier 96 operates as a current to voltage source having an output V which conforms to the relationship $V = -IR$, where I is the output current of the D/A converter 50, and R is the internal feedback resistor contained in the D to A converter 50.

The control voltage signal provided at the output of the operational amplifier 96, which in the disclosed illustrated embodiment can vary from −5 volts to +5 volts depending on the coded input signal to the D/A converter 50, is fed to the voltage amplifier 52, which in the illustrated embodiment is a noninverting operational amplifier strated embodiment is a noninverting operational amplifier (e.g., a 741 operational amplifier circuit), having a gain of approximately 3. The output of the voltage amplifier 52 is in turn connected by a diode 98 to the control input of the power amplifier 36, which is illustrated and realized by a Darlington transistor pair which is connected in series between the +15 V supply and one end of the coil 100 of the solenoid 34, whose other end is connected to −15 V. With this arrangement, the voltage across the solenoid can be effectively varied up to 28 V, which is the voltage required in order to obtain the maximum velocity of the solenoid plunger 62 for the selected solenoid.

Before turning to a description of the flow diagrams for the preferred embodiment of the invention, it should be pointed that, it has been found that some error can be introduced into the velocity measurement due to surface adhesion which may exist between the rear surface of the solenoid plunger 62 and a stop plate normally provided in the solenoid plunger to limit the rearward travel of the plunger 62 and against which the plunger rests before moving in response to an applied voltage. This surface adhesion is due to molecules on the end of the plunger and the surface of the stop plate which exert strong internal molecular forces on each other at the area of contact. In order to eliminate this error, according to a further feature of the invention, after initialization of the program but before to the application of the desired predetermined voltage to the solenoid to initiate impact, the program of the microprocessor 42 causes the voltage applied to the solenoid coil 100 to be increased in small increments or steps until movement of the solenoid plunger 62 is detected, and only then is the actual velocity measurement initiated by the application of the predetermined or adjusted voltage value to the solenoid coil 100. Movement of the solenoid plunger 62 is detected by the microprocessor 42 by sampling the output from the analog to digital converter 40 after each increment and by substracting the position value of the initial sample, i.e. the at rest position, and the position value for the present sample, until a difference other than zero is determined, indicating that the solenoid plunger 62 has moved. In the preferred illustrated embodiment of the invention wherein the A to D converter 40 is an eight bit converter with a unipolar 0 to 10 volt input range, resulting in approximately 39 millivolts per step change for the A/D converter 40, the initial incrementing of the solenoid voltage is carried out in forty millivolt steps or increments so as to provide for the greatest accuracy.

Figure 5:
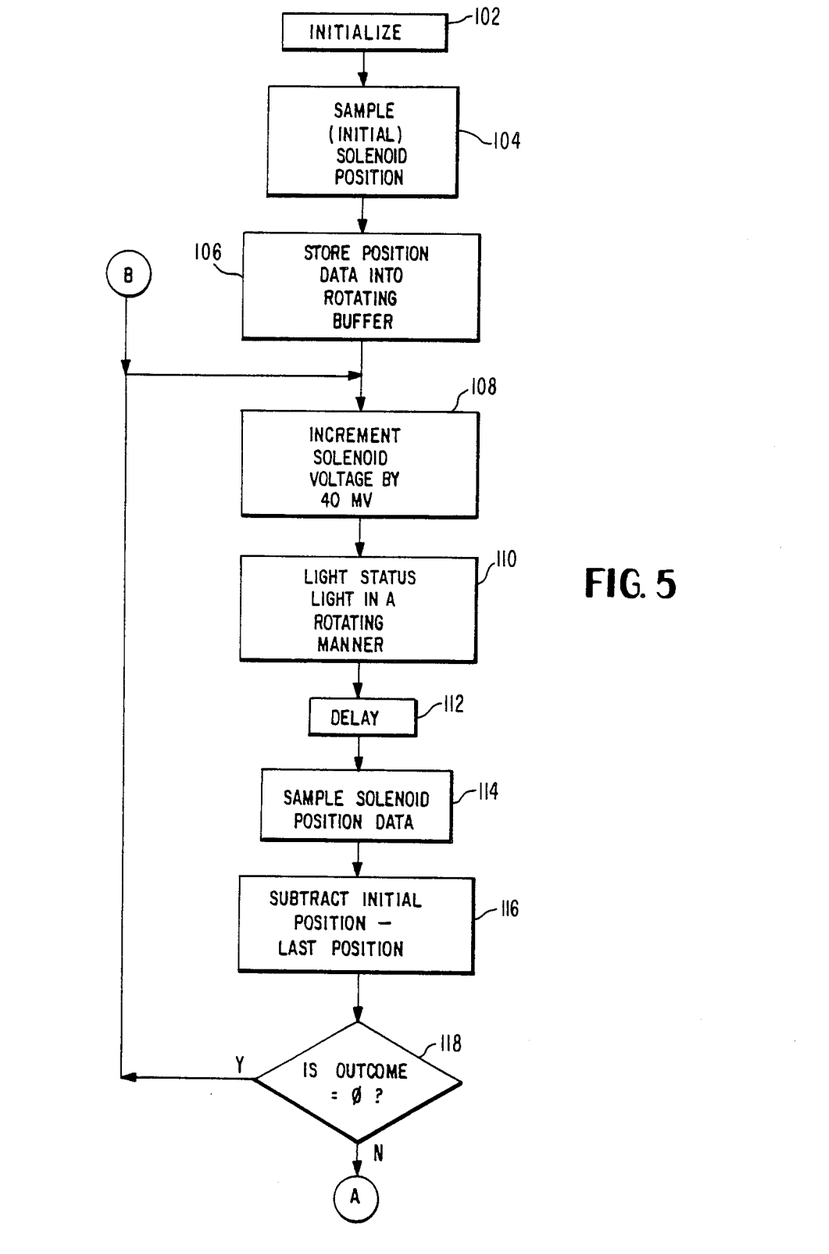
FIG. 5 to 7 are flow diagrams illustrating the flow of data under control of the microprocessor in order to carry out the method according to the invention.

Turning now to FIG. 5, operation of the preferred embodiment of the invention shown in FIG. 5 is started in that, upon application of power to the apparatus, the program is initialized (block 102), and the initial position of the solenoid plunger 62 is sampled (block 104) and stored (block 106) in a rotating buffer. Thereafter, the voltage applied to the solenoid coil is incremented (block 108) by forty millivolts and, according to a further feature of the invention, the velocity indicator status lights 90, 92 and 94 are caused to light (block 110) in a rotating manner so as to indicate to the operator that a measurement sequence is in progress. After a delay (block 112) and application of the voltage increment, the position of the solenoid plunger 62 is sampled (block 114), and the difference between the sampled position and the stored initial position is determined (block 116). If the outcome (block 118) is equal to 0 (Y), indicating that the solenoid plunger 62 has not moved, the voltage being applied to the solenoid coil is incremented (block 108) by an additional forty millivolts and the sampling and comparison with the initial position repeated until such time as a difference other than 0 is detected (N), indicating that the solenoid plunger 62 has moved.

Figure 6:
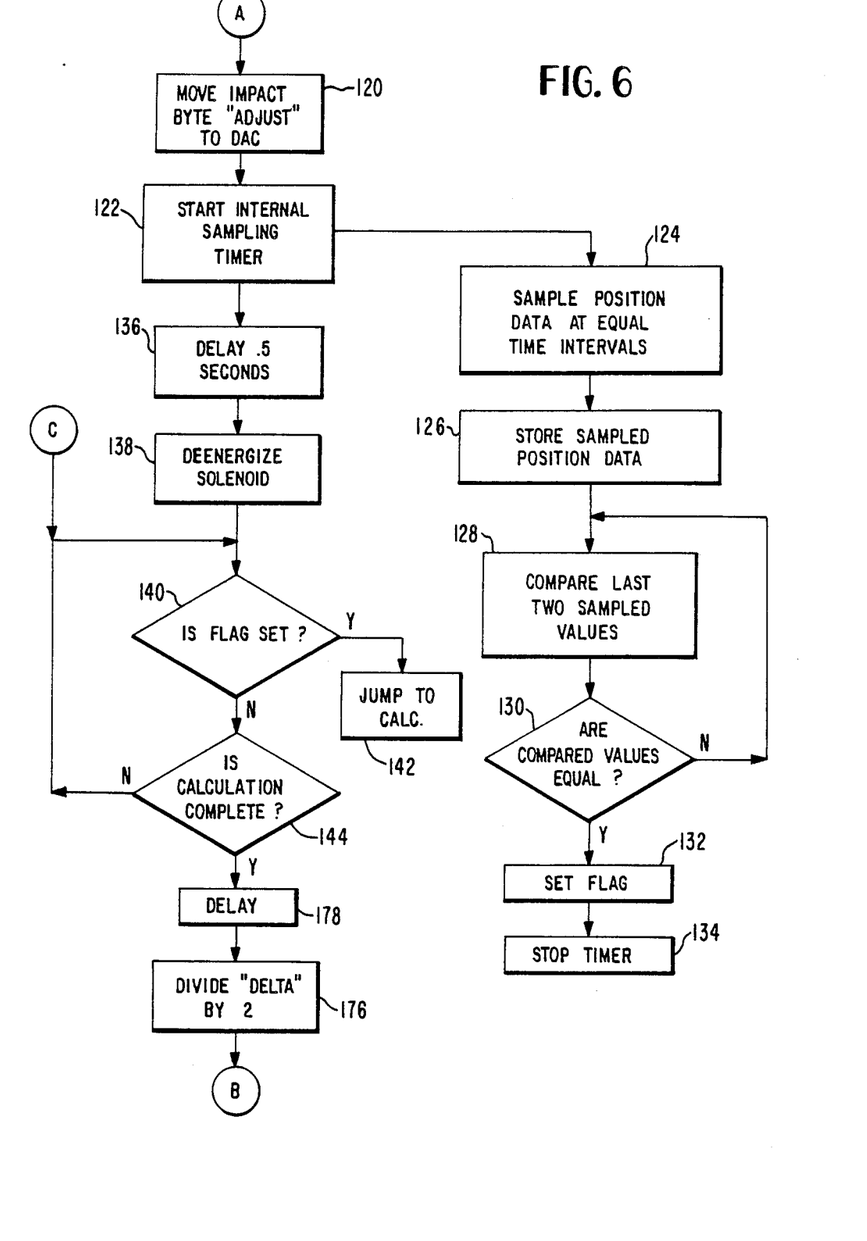

Upon detection of the movement of the solenoid plunger, as shown in FIG. 6, the impact byte "ADJUST", i.e. the coded value corresponding to the predetermined voltage value to be applied to the solenoid coil 100, is fed (block 120) to the digital to analog converter 50, and thus the corresponding voltage value is applied to the solenoid coil 100. At that time, an internal sampling timer in the microprocessor 42 is started (block 122) and the position data for the solenoid plunger 62 as provided by the A/D converter 40 is sampled (block 124) at equal time intervals, for example, 1 millisecond. The sequentially sampled position data is stored (block 126) in a rotating buffer and the last two sequentially sampled position values compared (block 128). If the two compared sampled values are not equal (block 130; N), then the comparison process is repeated until such time as the current last two sampled values are equal (Y), indicating that impact has occurred. At that time, a flag in the microprocessor is set (block 132) and the internal timer is stopped (block 134).

As further shown in FIG. 6, after a delay of 0.5 seconds (block 136), i.e. a delay sufficiently long to enable impact to have occurred, the solenoid 34 is de-energized (block 138) and a check is made (block 140) to see if the flag has been set. If the flag is set (Y), indicating that an impact has occurred, the subroutine for calculating velocity is initiated (block 142). Alternatively, if the flag is not set (N), then a check is made (block 144) to see if the calculation is complete, and if not (N) the setting of the flag continues to be checked. It should be noted, that although not indicated, the setting of the flag can additionally be controlled so that it will not be set unless the sampled position data indicating that the solenoid plunger 62 has travelled a predetermined minimal distance, for example three quarters of its travel length, in order to be able to detect a possible malfunction of the solenoid, and thus a false velocity reading.

Figure 7:
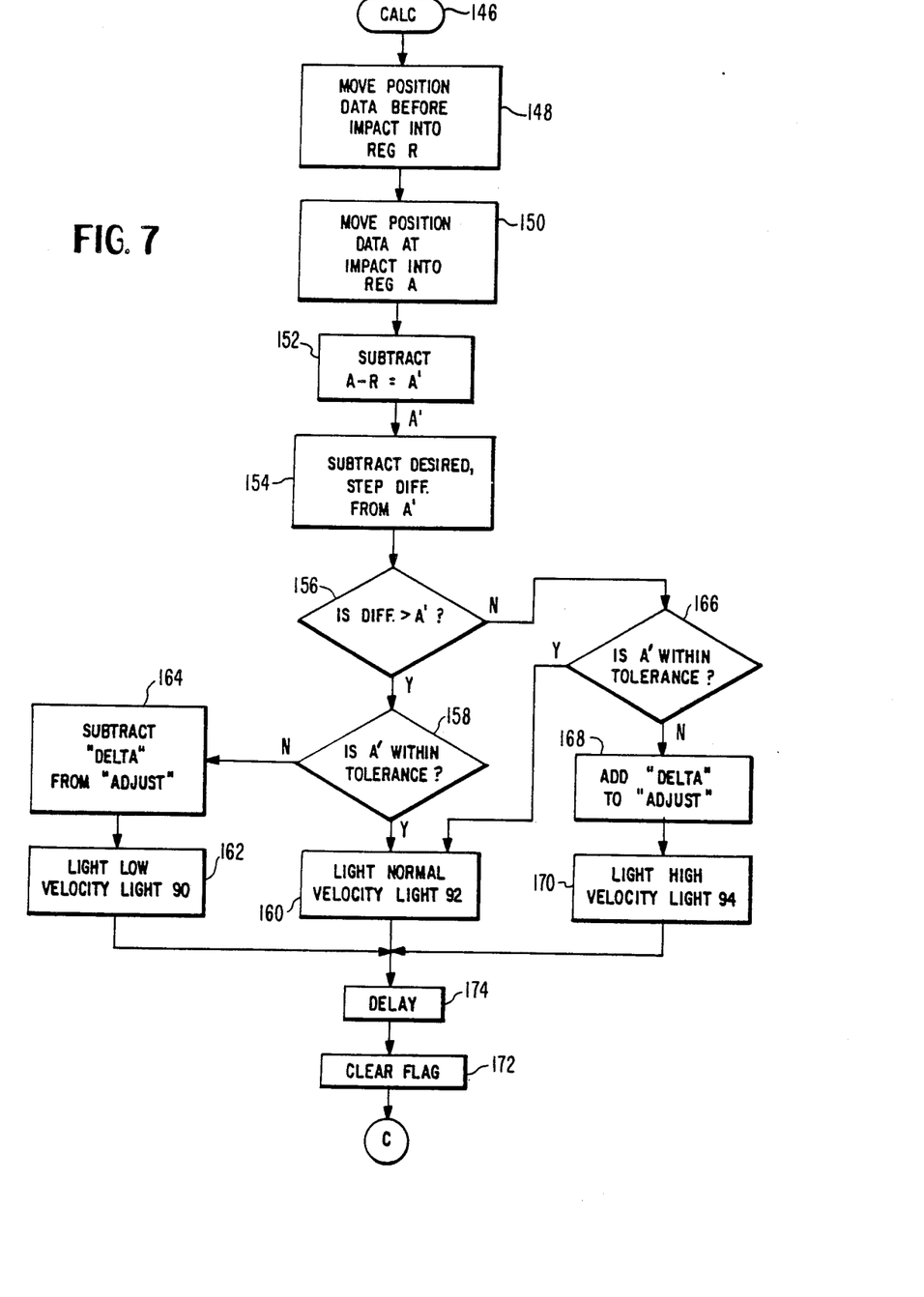

As shown in FIG. 7, in the "calc" subroutine (146), the sampled position data for the sample immediately proceeding the impact position is moved (block 148) from the buffer into the working register R of the microprocessor 42 and the sampled position data at the impact position is moved (block 150) into the accumulator register A of the microprocessor 42. Thereafter, the position data or value before impact is subtracted (block 152) from the position data or value at impact in the accumulator register A to provide a difference value A' in the accumulator register. Since, as indicated above, the sampling takes place at one millisecond intervals, the difference value A' is a direct measure of the final velocity of the plunger 62 and thus of the impact energy. Thereafter, the value A' is compared with a value corresponding to the desired velocity (impact energy) stored in a memory in the microprocessor 42. Since the difference value A', is simply a measure of the step difference of the A/D converter 40 in the measuring time interval, the stored desired value may simply correspond to the desired step difference. For example, with the particular solenoid 34, linear differential transformer 53 and A/D converter 40, it was found that a step difference of twenty eight would produce the desired impact energy of 0.68 joules.

In order to carry out the comparison, as shown in FIG. 7, the stored value corresponding to the desired velocity, i.e. the desired step difference, is subtracted (block 154) from the value A' and a determination is made (block 156) whether the resulting difference is greater than A'. If such is the case (Y), then a check is made (block 158) to see whether the value A' is within a given tolerance range of the desired velocity value and if so (Y), the normal velocity light 92 is lit (block 160). Alternatively, if the difference value is greater than A' but A' is not within the given tolerance value (N), indicating that the impact velocity was too low, then the "ADJUST" byte stored in the input/output expander circuit 46 is adjusted so as to produce an increased velocity upon the next test cycle, and the low velocity indicator light 90 is lit (block 162). In the preferred embodiment of the invention illustrated in FIG. 4, and as indicated in FIG. 7, the modification of the "ADJUST" byte upon detection of a low velocity measurement is achieved by subtracting (block 164) a stored predetermined value "DELTA" from the "ADJUST" byte, with "DELTA" initially having a value equal to one half of the initial "ADJUST" byte.

As further shown in FIG. 7, if the difference between the value A' and the desired velocity value is not greater than the value A' (i.e., an N result from block 156), then an additional check is made (block 166) to determine whether the value A' is within the given tolerance value, and if so (Y) the normal velocity indicator light 92 is lit (block 160). Alternatively, if the value A' is not (N) within the given tolerance value, indicating that the measured velocity was too high, in this case the value "DELTA" is added (block 168) to the stored "ADJUST" byte, and the high velocity indicator light 94 is lit (block 170).

After lighting the appropriate one of the indicator lights, 90, 92 and 94, the flag is cleared (block 172) after a suitable delay (block 174). Accordingly, upon the next check of the flag condition (block 140 in FIG. 6), and a determination that the calculation has now been completed (Y), the program will cause the value "DELTA" to be divided (block 176) in half after a delay (block 178). The division (block 176) may be accomplished, for example, by simply shifting the "DELTA" value one step to the right in its storage register, so as to provide a new "DELTA" value for the immediately subsequent measurement. Thereafter, the program causes the next measurement to be initiated (see FIG. 5) by applying an increment (block 108) of 40 millivolts to the solenoid 34, and the above described measurement process to be successively repeated until such time as the power is removed from the microcomputer 42 or, as indicated above, the program is reset by use of the switch 82 (FIG. 4). The measuring process is preferably repeated until such time as the normal velocity indicator light 92 has been lit (block 160 in FIG. 7) upon two successive velocity measurements.

It will be understood that the above description of the present invention is susceptible to various modifications, changes and adaptations, and the same are intended to be comprehended within the meaning and range of equivalents of the appended claims.

What is claimed is:

1. A method of impacting a surface with a desired kinetic impact energy comprising the steps of:
   (a) providing an impacting device which can apply a variable impact energy corresponding to the magnitude of an input control signal;
   (b) placing said impact device adjacent the surface to be impacted;
   (c) thereafter applying an input control signal of a preset magnitude to said impact device to initiate an impact;
   (d) determining the kinetic energy of the impact;
   (e) comparing the value of the determined kinetic energy with a value corresponding to the desired kinetic impact energy;
   (f) indicating the results of the comparison;
   (g) adjusting the preset magnitude of the signal used for said control signal to reduce any difference as a result of comparison; and
   (h) thereafter repeating steps (c) to (g) until a repeatable impact of the desired impact energy is determined and indicated.

2. A method as defined in claim 1 wherein said impacting device is a solenoid whose plunger provides the impact; wherein said input control signal is an input voltage applied across the solenoid coil; and wherein said step of determining includes; measuring the velocity of the plunger just prior to impact.

3. A method as defined in claim 2 further comprising: prior to each said step (c), slowly increasing the magnitude, starting from zero, of a voltage signal supplied to said solenoid coil until initial movement of said plunger is detected; and carrying out said step (c) upon said detection of initial movement of said plunger.

4. A method as defined in claim 2 wherein said step of measuring includes:
   detecting the movement of said plunger and producing an output signal whose magnitude is proportional to the distance moved by said plunger after application of said input voltage;
   sampling the magnitude of said output signal at uniform time increments;
   subtracting the sampled values from successive sampling times to provide difference values;
   and, upon detecting a zero difference value, indicating that impact has occurred, utilizing the immediately previously provided difference value as a measure of the velocity of the plunger just prior to impact, and thus of the kinetic impact energy.

5. A method as defined in claim 4 further comprising: prior to each said step (c), slowly increasing the magnitude, starting from zero, of a voltage signal applied to said solenoid coil, and sensing the position of said plunger; and carrying out said step (c) upon sensing of an initial change in the position of said plunger.

6. A method of testing the sensitivity of an impact detector mounted on a surface of a nuclear reactor coolant surface comprising: impacting a surface of the nuclear reactor adjacent the detector according to the method defined in claim 1 and selecting said desired kinetic impact energy to correspond to the desired sensitivity of the impact detector.

7. Apparatus for impacting a surface with a desired kinetic impact energy comprising, in combination:
   first means for applying a controllable impact force, corresponding to the magnitude of an input signal, to an adjacent surface;
   second means, responsive to an input control signal, for supplying an input signal of a preset magnitude to said first means to produce said impact force;
   third means for determining the kinetic energy of the impact;
   fourth means for comparing the kinetic energy of the impact with a desired kinetic energy value and for producing an output signal corresponding to any difference;
   fifth means for indicating the results of such comparison;
   sixth means, responsive to said output signal from said fourth means for adjusting said preset magnitude of said input control signal to reduce any error; and
   seventh means for supplying said input control signal at desired times to initiate an impact.

8. Apparatus as defined in claim 7 wherein said seventh means supplies said input control signal upon initial energizing of said apparatus and thereafter following each adjustment of said preset magnitude by said sixth means.

9. Apparatus as defined in claim 8 wherein: said first means comprises a solenoid having a plunger of known mass and a coil across which said input signal of preset magnitude is supplied; and said third means comprises means for determining the final velocity of said plunger.

10. Apparatus as defined in claim 9 wherein said means for determining the final velocity includes: means for detecting the position of said plunger and for producing an output signal corresponding to same; means for sampling said output signal from said means for detecting at uniform time intervals; and means for determining the absence of a difference between successive sampled values and for utilizing the immediately proceeding difference between sampled values as a measure of the final velocity, and thus of the kinetic energy of impact.

11. Apparatus as defined in claim 9 wherein said seventh means includes means for initially slowly increasing the magnitude of a voltage supplied to said solenoid coil; means for detecting any movement of said plunger while said voltage is being increased; and means responsive to the detection of initial movement of said plunger for causing said input signal of a preset magnitude to be supplied to said first means.

12. Apparatus for impacting a surface with desired kinetic impact energy comprising in combination:
a solenoid having a coil and a plunger of known mass;
means, responsive to an input control signal, for applying an input voltage of a preset magnitude across said coil for a given time period;
means for detecting the position of said plunger and for producing an output signal corresponding to the instantaneous said position;
means for sampling said output signal at uniform time intervals, and for storing at least the last three sampled values;
first comparing means for comparing successive sampled values and for stopping the sampling when no difference between two successive sampled values is detected;
second comparing means for comparing the difference between the last two different sampled values and a constant value corresponding to the desired impact energy, and for producing an output signal indicative of any difference;
means for indicating the results of the comparison by said second comparing means;
means, responsive to the output signal from said second comparing means, for adjusting said preset magnitude of said input voltage to reduce any error; and
means for thereafter supplying a further control signal to said means for applying to cause same to apply an input voltage of the adjusted preset magnitude to said coil.

13. Apparatus as defined in claim 12 wherein said means for applying an input voltage further includes: means, responsive to the receipt of said control signal, for initially applying a voltage across said coil in increasing increments until said means for detecting the position of said plunger produces an output signal indicating a change of position from the initial rest position of said plunger; and for thereafter causing said input voltage of a preset magnitude to be applied across said coil.

14. Apparatus as defined in claim 12 wherein said means for detecting the position of said plunger includes: a linear variable differential transformer having a primary winding, a pair of secondary windings connected in series opposition and a linearly moveable core; a nonmetallic rod mechanically connecting said core to said plunger for movement therewith; a voltage source for applying a voltage across said primary winding; and means connected across said series connected secondary windings for producing an output voltage whose magnitude corresponds to the instantaneous position of said core, and hence of said plunger.

15. Apparatus as defined in claim 14 wherein: said voltage source comprises a high frequency signal generator; and said means connected across said series connected secondary windings comprises passive demodulator means for demodulating the output signal from said secondary windings and a voltage amplifier connected to the output of said demodulator for providing a liner d.c. output signal whose magnitude corresponds to the position of said core.

16. Apparatus as defined in claim 12 wherein said means for indicating includes first, second and third indicator lamps, and means for energizing said first indicator lamp when said output signal from said second means for comparing indicates no difference and for energizing a respective said second and third of said indicator lamps when said output signal from said second comparing means indicates that said difference between the last two different sampled values and said constant value is respectively greater or less than the desired said constant value.

* * * * *